United States Patent [19]

Porter

[11] Patent Number: 4,872,368
[45] Date of Patent: Oct. 10, 1989

[54] PUSH-TO-RELEASE CABLE OPERATING APPARATUS

[75] Inventor: Curtis H. Porter, Moberly, Mo.
[73] Assignee: Orscheln Co., Moberly, Mo.
[21] Appl. No.: 225,287
[22] Filed: Jul. 28, 1988
[51] Int. Cl.$^4$ .............................................. G05G 5/06
[52] U.S. Cl. ........................................ 74/542; 74/535
[58] Field of Search ................... 74/512, 575, 577 M, 74/577 R, 531, 533, 535, 540, 541, 542; 188/2 D; 411/504

[56] References Cited

U.S. PATENT DOCUMENTS

| | | | |
|---|---|---|---|
| 2,088,054 | 7/1937 | Crosman | 74/540 X |
| 2,174,995 | 3/1939 | Osborne | 411/504 X |
| 3,282,125 | 11/1966 | Dully | 74/512 X |
| 3,590,656 | 7/1971 | Lloyd | 74/575 |
| 3,625,087 | 12/1971 | Flory | 74/512 X |
| 3,650,157 | 3/1972 | Strathearn | 74/575 X |
| 4,612,823 | 9/1986 | De Leeuw | 74/535 X |

FOREIGN PATENT DOCUMENTS

| | | | |
|---|---|---|---|
| 2118515 | 10/1972 | Fed. Rep. of Germany | 74/535 |
| 963729 | of 1950 | France | 74/535 |
| 67145 | 4/1984 | Japan | 74/512 |

*Primary Examiner*—Gary L. Smith
*Assistant Examiner*—F. Saether
*Attorney, Agent, or Firm*—Laubscher, Presta & Laubscher

[57] ABSTRACT

A cable operating apparatus includes a pawl and ratchet arrangement for maintaining an operating lever in a cable-tensioning position. The pawl is bifurcated to define a pair of pawl tips, the pawl being pivotable in opposite directions for effecting alternate engagement of the pawl tips with the ratchet. The pawl contains a slot that receives the pawl pivot pin and which permits lateral movement of the pawl between a pair of end positions. An overcenter spring arrangement alternately pivotally biases the pawl in opposite directions when the pawl is displaced toward the end positions, respectively. A cam arrangement serves to effect lateral displacement and pivotal movement of the pawl when the operating lever is pivoted from the released position toward a cable tensioning position. When the operating lever is locked in a cable-tensioning position by the pawl and ratchet arrangement, further movement of the lever in the cable-tensioning direction causes release of the pawl from the ratchet, whereupon the operating lever may either be pivoted further in the cable-tensioning direction, or released for return to the cable-released or off position. According to a modification, a manually operable release rod may be provided for releasing the pawl from the ratchet.

11 Claims, 6 Drawing Sheets

PUSH-TO-RELEASE CABLE OPERATING APPARATUS

REFERENCE TO RELATED APPLICATION

This patent application is related to the companion U.S. patent application Ser. No. 238,131 filed Aug. 30, 1988 by Curtis H. Porter entitled Foot-Operated Self-Adjusting Parking Brake Apparatus With Controlled Flyback.

BRIEF DESCRIPTION OF THE PRIOR ART

Push-to-release controls for vehicle parking brakes and the like are well known in the patented prior art, as evidenced, for example, by the prior patents to Koskela No. 2,940,334, McKenzie No. 3,003,365, Ellis No. 3,273,418 and Yasiro No. 3,511,107, among others. As is known in such parking brake controls, the brake may be released from a cable-tensioning locked condition merely by tapping or applying force to the brake-applying pedal.

It is also known in the ratchet and pawl art —as evidenced by the German patent No. 155,341, for example —to provide a bifurcated pivotally mounted pawl having a pair of pawl teeth that alternately cooperate with a ratchet, and the French patent No. 963,729 discloses a pawl that is biased by overcenter toggle spring means between a first position in which the pawl tip engages the ratchet, and a second position against a stop in which the pawl tip is disengaged from the ratchet.

The Vogelsang patent No. 3,391,907 broadly teaches the use of cam and follower means for controlling pawl operation, and the Hybarger et al patent No. 3,648,541 broadly teaches an emergency brake arrangement in which the pawl comprises a toggle, and a cam force is employed in the release structure to minimize the force required to release the locked pawl. The Marx patent No. 3,929,033 teaches a vehicle parking brake control including resilient bumpers for cushioning and stopping the return of the foot pedal and for receiving the impact of the released pawl.

The present invention was developed to provide an improved positive-acting relatively economical parking brake cable control apparatus of the pawl and ratchet type that is easily manufactured and assembled, and is of durable long-lived construction.

SUMMARY OF THE INVENTION

Accordingly, a primary object of the present invention is to provide a manually or foot-operated control mechanism for parking brakes or the like including a lever arm that is pivotally connected with a suitable mounting means and is provided with a mechanical means for locking and releasing cable load or tension.

Another object of the invention is to provide a parking brake control with the capability of initiating release of the cable tension by means of reapplying, through the lever arm, a force equal to the original input force.

A further object of the invention is to provide a parking brake control that allows the operator to continue to apply additional cable tension after the control has already been applied, regardless of its position without first returning the lever to the OFF or released position.

Still another object of this invention is to provide a control that can be modulated without the use of a remote release handle, lever, or similar mechanism. Therefore, the operator is allowed to complete the parking brake control by applying or relieving the load with his foot.

Another object of the present invention is to eliminate the high energy shock, known as "slam off", that is normally applied to the control when the cable tension is released.

Another object of this invention is to minimize the amount of lost cable travel due to linear movement of the pawl, by the use of a toggle spring to reverse the reaction movement about the pawl pivot.

According to another object of the invention, manually operable release rod means are provided for releasing the locking pawl from its ratchet, so that for vehicles provided with manual transmissions, the operator is free to operate the accelerator and clutch pedal simultaneously. Thus, when release is needed, it may be obtained manually by use of the operator's hand.

An additional object of this invention is to provide a more cost effective parking brake control by reducing the number of parts as compared to a standard control mechanism.

According to the present invention, the pawl and ratchet means for locking the operating lever in a cable-tensioning position includes a pawl that is is bifurcated to define a pair of pawl tips that are alternately engaged with the ratchet teeth. The pawl is also provided with a slot that permits lateral displacement of the pawl relative to its pivot pin between a pair of end positions, thereby to operate overcenter spring biasing means, whereby when the pawl is in one end position, it is pivotally biased in one direction, and when in the other end position it is pivotally biased in the opposite direction. Cam means are provided for laterally displacing the pawl to trip the overcenter spring means when the operating lever is initially displaced from its off or cable-released condition. Consequently, when the operating lever is in a cable-tensioning pawl-locked position, the pawl is released from the ratchet upon further movement of the operating lever in the cable-tensioning direction, whereupon the lever may either be released for return to its initial cable released position, or may be pivoted further in the cable-tensioning direction.

BRIEF DESCRIPTION OF THE DRAWINGS

Other objects and advantages of the invention will become apparent from a study of the following specification, when viewed in the light of the accompanying drawings, in which.

DETAILED DESCRIPTION

Figures 1, 7:
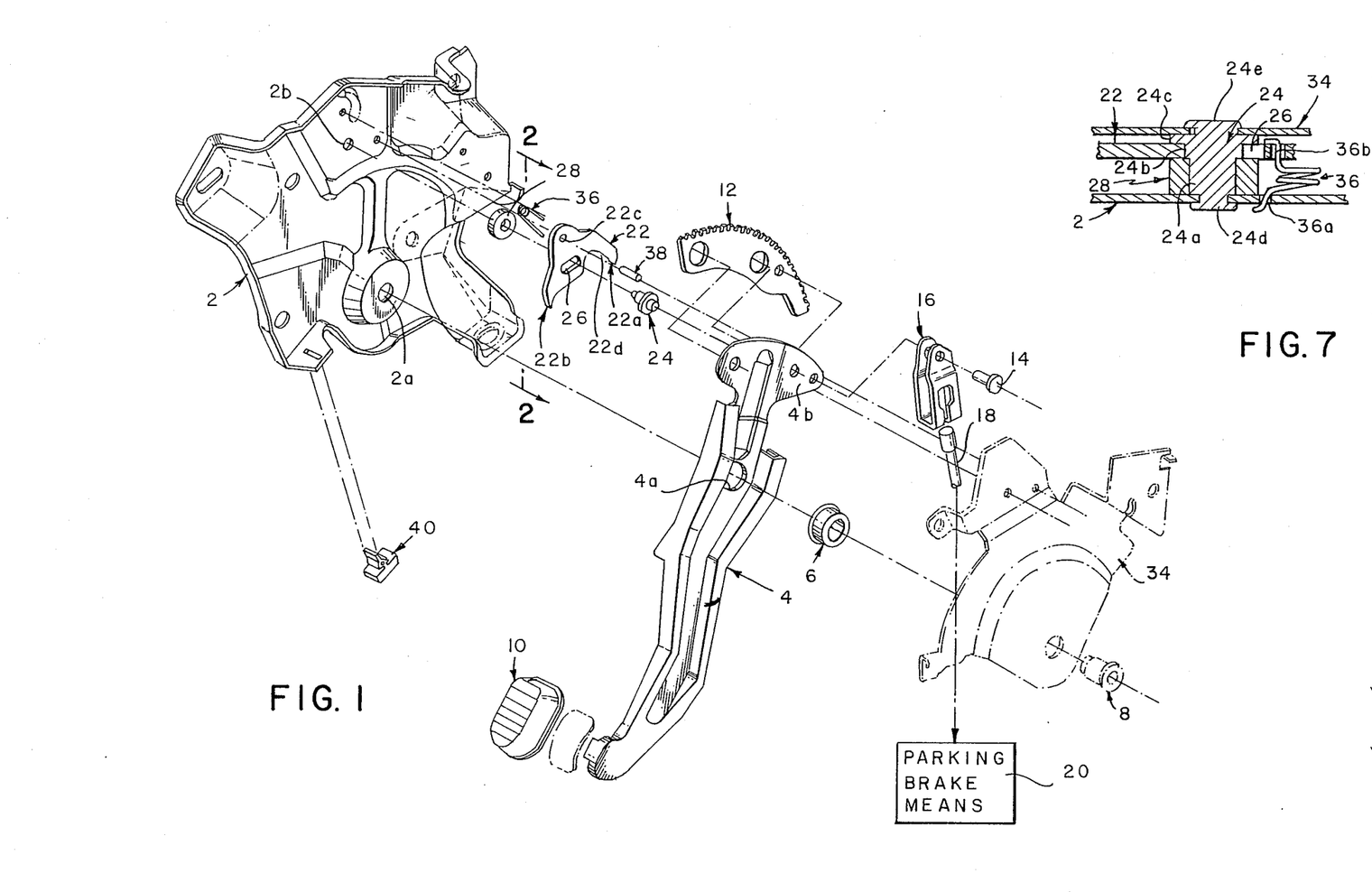
FIG. 1 is an exploded view of the cable operating apparatus of the present invention.
FIG. 7 is a detailed sectional view of the pivot pin relative to which the pawl is both pivotally and laterally displaceable.

Referring now and more particularly to FIGS. 1 and 7, the illustrated parking brake control apparatus includes a mounting bracket 2 that is adapted to be secured to the chassis of a motor vehicle. Pivotally connected intermediate its ends with the mounting bracket is an operating lever 4 that contains an opening 4a for receiving an annular bushing 6 through which a pivot pin 8 extends for insertion within a corresponding opening 2a contained in the mounting bracket. At one end, the operating lever is provided with the conventional foot pad operator 10, and at the other end the operating lever has a plate-like extension 4b to which is clinched the ratchet 12 by a suitable extrusion (not shown). Also connected with the plate-like extension 4b by pivot pin 14 is a pivotally movable clevis member 16 to which is connected one end of the cable 18 that extends to the parking brake means 20. Associated with the ratchet 12 is a pawl member 22 that is bifurcated to define a pair of pawl tips 22a and 22b. The pawl is connected for pivotal movement relative to the mounting bracket 2 by means of a pawl pivot pin 24 that extends through an oversize slot 26 contained in the pawl 22, and concentrically through an annular spacer member 28 contained by pawl pivot pin 24, and provides proper spacing from mounting bracket 2 and insures proper plane alignment between the ratchet 12 and pawl 22. As shown in greater detail in FIG. 7, the pawl pivot pin 24 includes a first cylindrical portion 24a of a relatively small diameter corresponding with the inner diameter of the annular spacer member 28, a second stepped portion 24b of a larger diameter that is seated on the spacer member 28, and a stepped third portion 24c that retains the pawl 22 in the same plane as the ratchet 12. The pawl pivot pin 24 includes swaged end portions 24d and 24e that retain the pawl pivot pin 24 between the mounting bracket 2 and the housing cover member 34. Arranged in the space between the pawl 22 and the mounting bracket 2 is a helical torsion-type toggle spring 36 having at opposite ends leg extremities 36a and 36b that extend through corresponding openings 2b and 22c contained in the mounting bracket 2 and the pawl 22, respectively, as shown in FIG. 7.

Provided on the pawl on the inner surface of the pawl tip 22a is a cam surface 22d that is arranged for cooperation with a stationary cam follower member 38 that extends between the housing mounting bracket 2 and the housing cover member 34.

Resilient pad 40 on the mounting bracket cushions the operating lever when returned to the released or off position.

OPERATION

Figure 2:
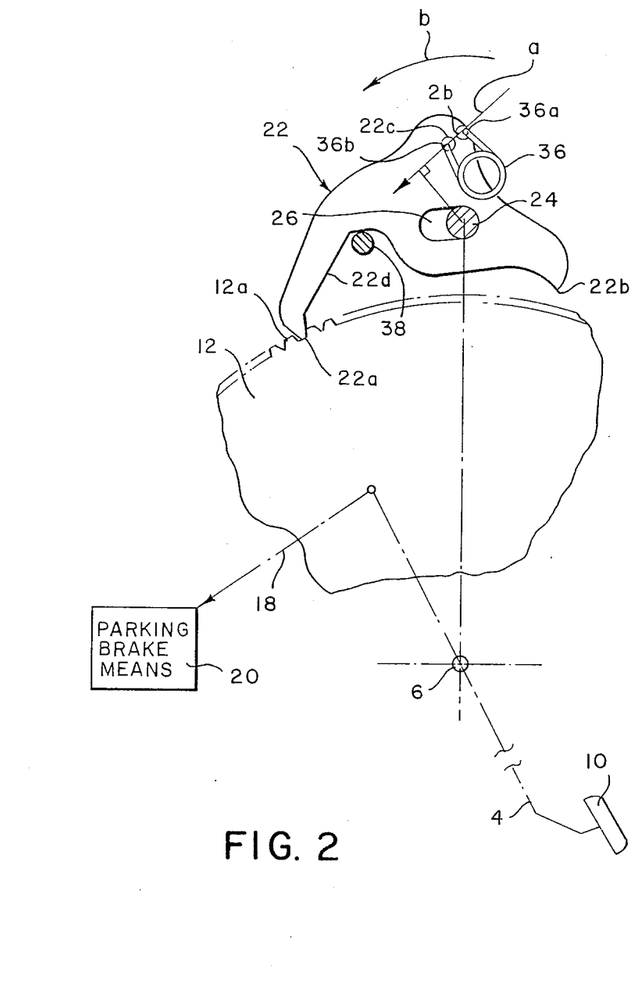
FIG. 2 is a detailed view of the pawl and ratchet means taken along line 2—2 of FIG. 1, with the operating lever in its fully released position and with the first pawl tip of the bifurcated pawl in engagement with the ratchet.

Assume that the operating lever 10 is in the released or off position of FIG. 2, wherein the parking brake cable 18 is in an untensioned condition, and the parking means 20 is released. Since the movable end extremity 36b of the helical toggle spring 36 is biased away from the stationary end extremity 36a as shown by the arrow a, pawl 22 is biased in the counterclockwise direction (arrow b) relative to the pawl pivot pin 24, thereby to effect engagement between pawl tip 22a and the ratchet teeth 12a.

Figure 3:
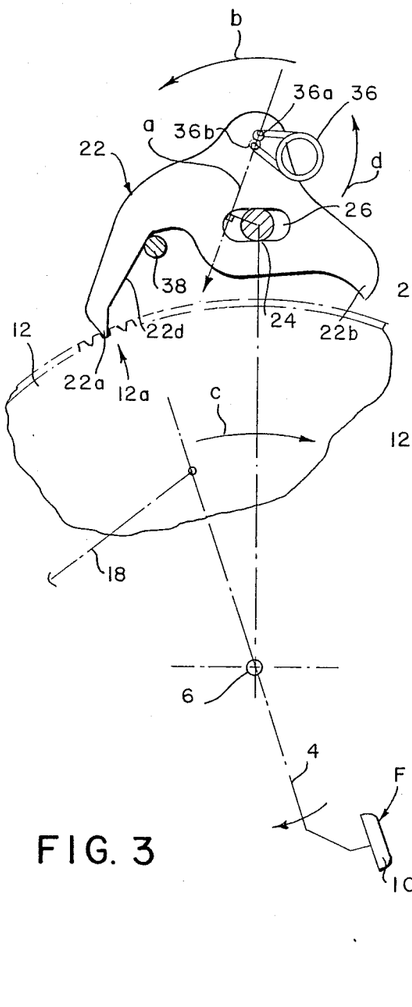
FIG. 3 is a figure illustrating the operation of the apparatus of FIG. 2 when an operating force is initially applied to the operating lever.
Figure 4:
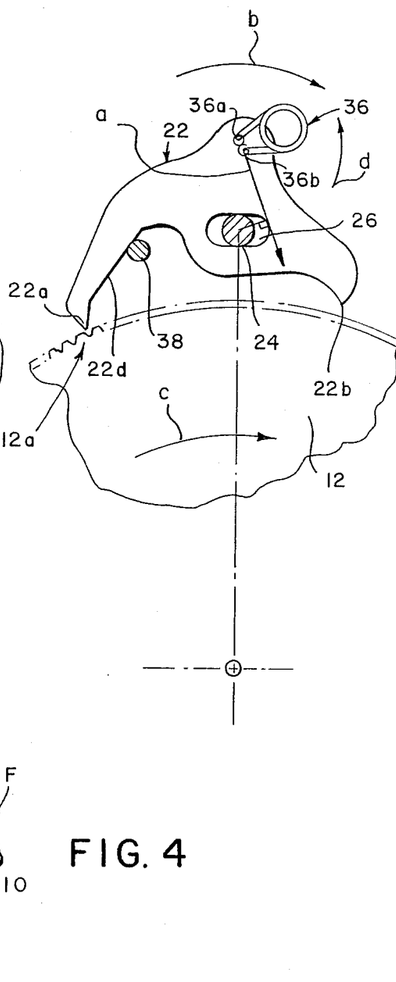
FIG. 4 illustrates the tripping of the overcenter spring means upon further application of force to the operating lever.
Figure 5:
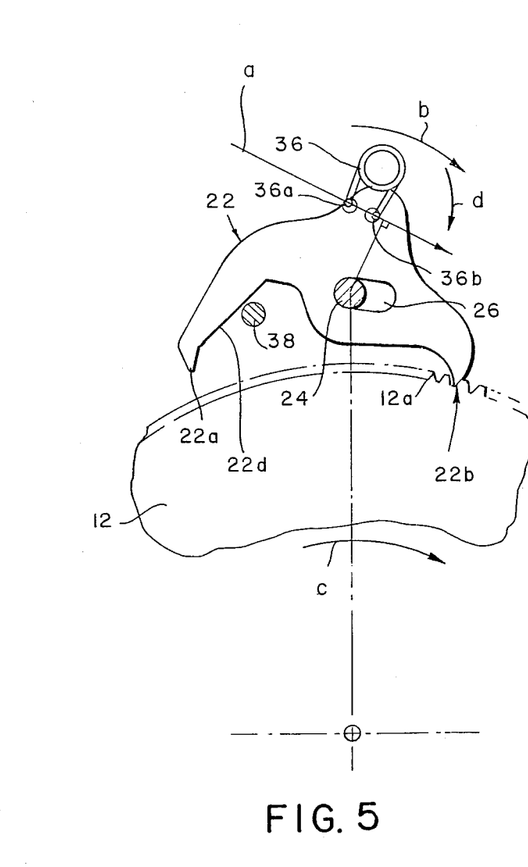
FIG. 5 illustrates the pawl being pivoted upon further application of force to the operating lever to cause the second pawl tip to engage the ratchet.
Figure 6:
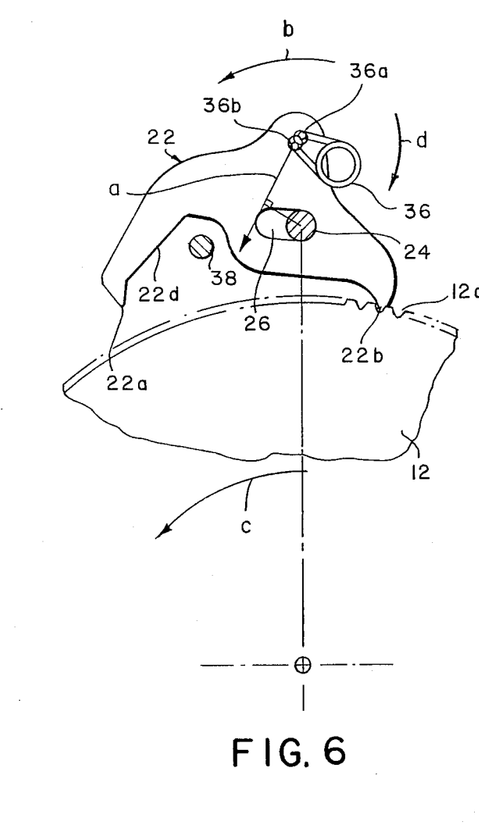
FIG. 6 illustrates the pawl in the locked cable-tensioning condition when the operating force is removed from the operating lever.

To apply tension to the parking brake cable 18 and thereby operate the parking brake means 20, the operator applies a force F to the foot pad 10 of the operating lever 4, thereby to pivot the operating lever 4 and the ratchet 12 in the clockwise direction (arrow C). Owing to the engagement between pawl tip 22a and the ratchet teeth 12a, the pawl 22 is shifted to the right relative to the pawl pivot pin 24 (FIG. 3), thereby to displace the end portions 36b of the toggle spring 36 relative to the stationary end portion 36a, whereby the spring 36 is pivoted in the counterclockwise direction (arrow d) about end portion 36a toward its overcenter toggle position. When the toggle spring end portion 36b is displaced to the right beyond the overcenter position relative to the spring end portion 36a, the toggle spring 36 expands and is pivoted further toward the overcenter position illustrated in FIG. 4, whereupon the pawl 22 is now biased in the clockwise direction (arrow b) about its pivot axis 24. Owing to the cooperation between the stationary cam follower 38 and the cam surface 22d on the pawl 22, the pawl is pivoted in the clockwise direction (arrow b) to disengage pawl tip 22a from the ratchet teeth 12a. As shown in FIGS. 3 and 4, the toggle spring 36 produces continued pivotal movement of the pawl in the clockwise direction (arrow b) until the second pawl tip 22b engages the ratchet teeth 12a. At this time, the pawl 22 will have been shifted to its second end position relative to the pawl slot 26 (FIG. 5). The operator continues to apply parking-brake-applying force F to foot pedal 10 until the desired cable tensioning is produced, whereupon the operator removes the force F from the parking brake pedal 10. Owing to the tensioning of the parking brake cable as well as the engagement between the second pawl tip 22b and the ratchet teeth 12a, the parking brake lever 4 and the ratchet 12 are pivoted slightly in the counterclockwise direction to displace pawl 22 to the left relative to the pawl pivot pin 24, whereupon the pawl pivot pin 24 is again in the first end position relative to the pawl slot 26 (FIG. 6). During this lateral movement of the pawl from its second end position of FIG. 5 toward the first end position of FIGS. 2 and 6, the toggle spring 36 is displaced to its toggled overcenter position illustrated in FIG. 6, thereby having the stored potential to pivotally bias the pawl in the counterclockwise direction (arrow b) relative to the pawl pivot pin 24. The parking brake control means is now locked in its cable-tensioning position illustrated in FIG. 6.

Assuming now that the operator desires to release the parking brake control apparatus, he merely again applies sufficient force F to the operating lever foot pad 10 to effect clockwise movement of the operating lever 4 and the ratchet 12 to effect lateral displacement of the pawl to the right relative to pawl pivot pin 24, whereupon the pawl is displaced toward its second end position. Owing to the biasing force of the toggle spring 36, the pawl is rotated in the counterclockwise direction to disengage the pawl tip 22b from the ratchet teeth 12a. The pawl continues to pivot in the counterclockwise direction until pawl tip 22a engages the ratchet teeth 12a (FIG. 2). Owing to the configuration of the ratchet tip 22a, as the operator removes pressure from the parking brake foot pad 10, the tension in the cable 18 is relieved and the operating lever 4 and ratchet 12 are returned to the initial released or off position of FIG. 2.

Of course, in the event that the apparatus were to be in the brake-engaged cable-tensioning condition of FIG. 6, the system is designed such that the operator may reapply the control from any point at which the mechanism has been locked by simply reapplying load to the foot pedal pad 10. Thus, upon the application of force to the operator lever 4 to displace ratchet 12 slightly in the clockwise direction, the pawl is released so that the toggle spring 36 biases the pawl in the counterclockwise direction, thereby to disengage the pawl tip 22b from the ratchet teeth 12a. Owing to the biasing force of toggle spring 36, the pawl is pivoted in the counterclockwise direction toward the initial position of FIG. 2, whereupon owing to the tension in the cable 18, the ratchet and lever arm will be pivoted in the counterclockwise direction toward the released or off condition of FIG. 2. In the event that the operator continues to apply force to the pedal arm 4, the action of the pawl will be repeated as shown in FIGS. 3-6.

Figure 8:
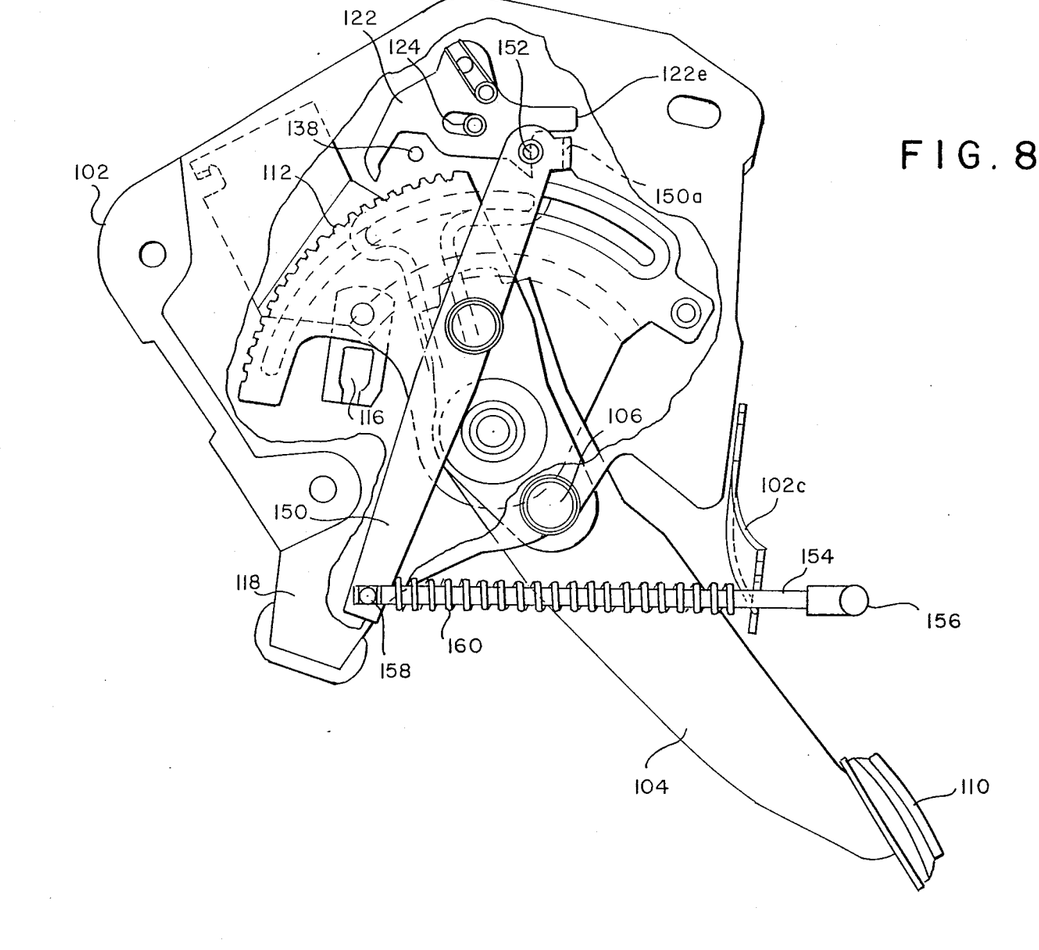
FIG. 8 is a modification of the apparatus of FIG. 1, illustrated, from the drivers side, in the rest or released position and provided with a manually-operable auxiliary release lever.
Figure 9:
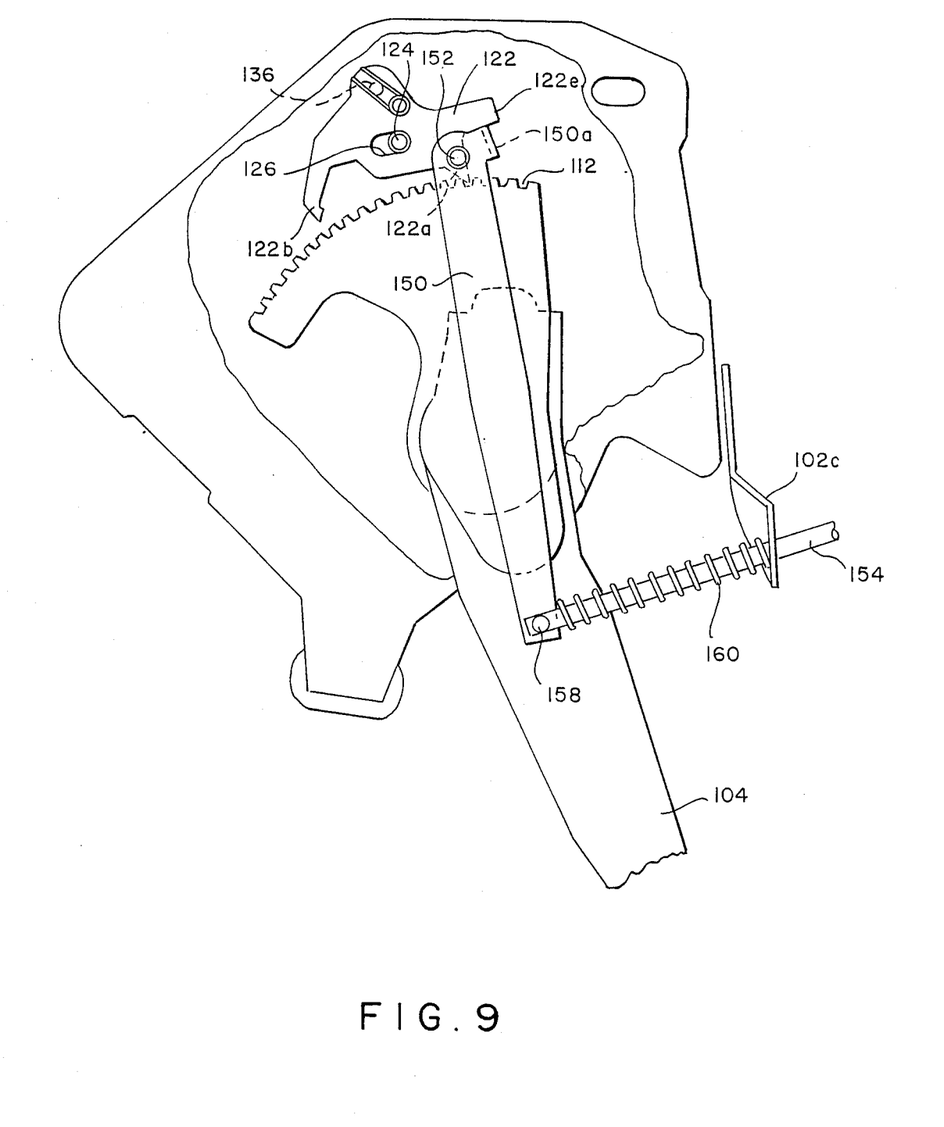
FIG. 9 is a detailed schematic view, with certain parts removed for clarity, of the apparatus of FIG. 8 when in the locked condition, and with the auxiliary lever withdrawn to a position in initial contact with the pawl.
Figure 10:
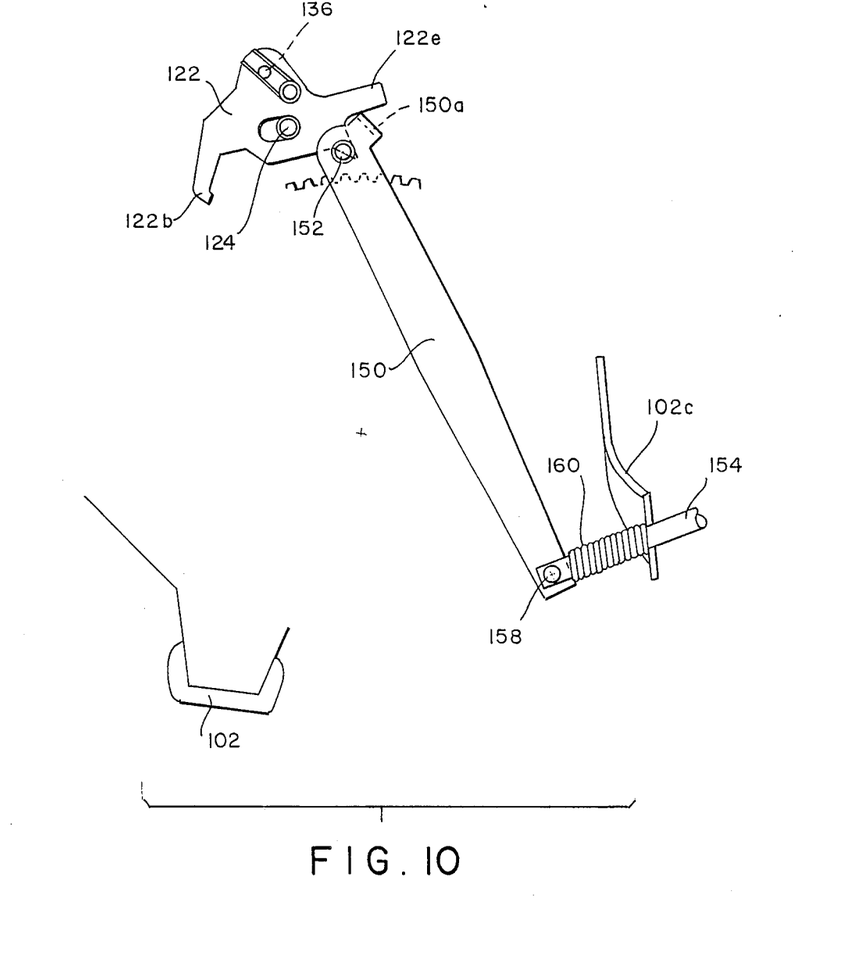
FIG. 10 illustrates the condition in which the auxiliary lever has been further withdrawn to release the pawl from its associated ratchet, and with the control in its disengaged condition.

Referring now to the modification of FIGS. 8-10 (wherein like parts have been identified with the prefix 100), a manually operable lever 150 is provided that is pivotally connected at one end by pivot pin 152 to the cover 134 between the housing 102 and the cover for releasing the pawl 122 from ratchet 112. A release rod 154 is mounted intermediate its ends for axial sliding travel in an opening contained in housing flange 102c, said release rod having at one end a pull handle 156 and being pivotally connected at its other end by pivot pin 158 with the other end of the release lever 150. Compression coil spring 160 is mounted concentrically on pull rod 154 between release lever 150 and the housing flange 102, thereby to bias release lever 150 in the clockwise direction about pivot pin 152.

In accordance with a characterizing feature of this embodiment, the release lever 150 is provided adjacent its pivot pin 152 with a laterally extending tab 150a that extends beneath a coplanar extension 122e of the pawl 122. Thus, when handle 156 is pulled to pivot release lever 150 in the counterclockwise direction about pivot 152 against the restoring force of spring 160, the tab portion 150a is displaced upwardly into engagement with the adjacent surface of pawl extension 122e, as shown in FIG. 9, and upon further withdrawal of the release rod 154, tab 150a causes pawl to be pivoted in the counterclockwise direction about pivot pin 124, thereby to disengage the pawl tooth 122a from ratchet 112, as shown in FIG. 10. The apparatus is now in the released condition, and the cable 118 is free to return to a zero load condition.

While in accordance with the provisions of the Patent Statutes the preferred forms and embodiments have been illustrated and described, it is apparent that various modifications might be made in the apparatus. For example, it is within the scope of this invention that various parts might be reversed, such as the pawl and the ratchet, without deviating from the disclosed invention.

What is claimed is:

1. Cable operating means, comprising:

(a) a mounting bracket member (2);
(b) an operating lever member (4) adapted for connection with one end of a cable, said operating lever being pivotally connected with said mounting bracket for pivotal movement between cable-released and cable-tensioning positions relative thereto;
(c) pawl and ratchet means for maintaining said operating lever in said cable-tensioning position, including:
  (1) a ratchet (12) connected with said operating lever member, said ratchet including a plurality of ratchet teeth;
  (2) a bifurcated pawl (22) having a pair of pawl tips (22a, 22b);
  (3) means including a pivot pin (24) mounted on said mounting bracket member connecting said pawl for pivotal movement relative to said bracket member between first (FIG. 2) and second (FIG. 6) enmeshed positions in which said pawl tips are in enmeshing engagement with said ratchet teeth, respectively; and
  (4) means connecting said pawl for lateral displacement between first (FIG. 2) and second (FIG. 5) end positions relative to said pivot pin, said connecting means including a slot (26) contained in said pawl for receiving said pivot pin;
(d) overcenter spring means including a toggle spring (36) connected between said mounting bracket member and said pawl, said overcenter spring means being alternately operable when said pawl is in said end positions for pivotally biasing said pawl in opposite directions relative to said pivot pin toward said first and second enmeshed positions, respectively, said spring means normally having a first (FIG. 2) overcenter condition pivotally biasing said pawl in said first direction when said operating lever is in the cable-released position and the pawl is in said first end position, thereby to effect enmeshing engagement between said first pawl tip and said ratchet; and
(e) cam means (22d, 38) operable solely when said pawl is in said first end and first enmeshed positions and when said operating lever is initially pivoted in the cable-tensioning direction for releasing said first pawl tip from said ratchet and for laterally displacing said pawl toward its second end position (FIG. 5), whereby said overcenter spring means is operated to a second overcenter condition (FIG. 4) to pivotally bias the pawl in the other direction toward its second enmeshed position;
(f) said pawl, upon release of said operating lever in the cable-tensioning position and with said pawl in said second end and second enmeshed positions being laterally displaced (FIG. 6) toward said first end position, thereby returning said spring means to said first overcenter condition;
(g) said pawl, when in said first end position and in said second enmeshing position (FIG. 6) upon the application of torque to said pawl in said first direction, being pivoted by said spring means directly to said first enmeshing position completely independent of said cam means.

2. Apparatus as defined in claim 1, wherein said cam means comprises a cam surface arranged on said pawl intermediate said pawl tips, and a stationary cam follower secured to said mounting bracket for engagement with said cam surface.

3. Apparatus as defined in claim 2, wherein said toggle spring comprises a helical torsion spring having at opposite ends a pair of eccentrically arranged axially extending end portions that extend in corresponding holes contained in said mounting bracket and in said pawl, respectively.

4. Apparatus as defined in claim 3, wherein said pivot pin includes a first cylindrical portion of relatively small first diameter adjacent said mounting bracket, and a stepped second cylindrical portion of relatively large second diameter adjacent said first cylindrical portion, and further including an annular spacer member mounted concentrically on said first cylindrical portion, said spacer member having an outer third diameter greater than said second diameter, said pawl being mounted for pivotal movement on said second cylindrical portion and being partially supported by said spacer member.

5. Apparatus as defined in claim 4, wherein said pivot pin includes an enlarged head portion for retaining said pawl on said second cylindrical portion and in engagement with said spacer member.

6. Apparatus as defined in claim 5, and further including a cover member cooperating with said mounting bracket to protectively enclose said pawl and ratchet means.

7. Apparatus as defined in claim 1, wherein said operating lever comprises a two-armed lever pivotally connected intermediate its ends with said mounting bracket, one end of said lever being connected with said ratchet, and further including an operating pad connected with the other end of said operating lever, the pivot axis of said operating lever being such that the distance between the pivot pin and the operating pad is greater than the distance between the pivot pin and the ratchet, said operating lever being adapted for connection with the cable adjacent the ratchet, thereby to afford a mechanical advantage for tensioning the cable.

8. Apparatus as defined in claim 1, and further including manually operable release means for pivoting said pawl in a direction to disengage said second pawl tip from said ratchet.

9. Apparatus as defined in claim 8, wherein said release means includes a release lever pivotally connected with said housing, said release lever including a lateral extension for pivoting said pawl to release said second pawl tip from said ratchet.

10. Apparatus as defined in claim 9, wherein said release rod means includes a pull rod pivotally connected at one end with said release lever, said pull rod being guided intermediate its ends by said housing and including at its other end a handle.

11. Apparatus as defined in claim 10, and further including spring means biasing said release lever toward a disengaged position relative to said pawl.

* * * * *